United States Patent [19]

Eason et al.

[11] Patent Number: 4,753,610

[45] Date of Patent: Jun. 28, 1988

[54] CONNECTORIZED TERMINAL BLOCK

[75] Inventors: John C. Eason, Snohomish; Gary J. Gunell; Scott Hopper, both of Seattle, all of Wash.

[73] Assignee: Telzon, Inc., Seattle, Wash.

[21] Appl. No.: 864,809

[22] Filed: May 19, 1986

[51] Int. Cl.[4] .............................................. H01R 9/24
[52] U.S. Cl. ................................... 439/571; 439/713; 439/719
[58] Field of Search ........... 339/198 R, 198 G, 198 P, 339/198 GA, 198 S, 198 H, 18 R, 18 B, 14 R, 125; 179/98, 91 R, 178, 179; 174/60, 59; 439/43, 709, 712, 713, 718, 719, 722, 571

[56] References Cited

U.S. PATENT DOCUMENTS

| | | | |
|---|---|---|---|
| 2,608,626 | 8/1952 | Morgan | 339/198 P |
| 2,952,828 | 9/1960 | Dorizzi | 339/198 S |
| 3,327,278 | 6/1967 | Godel | 339/18 |
| 3,329,927 | 7/1967 | Ayers | 339/198 |
| 3,408,613 | 10/1968 | Baker | 339/18 |
| 3,518,611 | 6/1970 | Shores, Jr. | 339/18 |
| 3,564,479 | 2/1971 | Gluntz | 339/14 |
| 3,564,485 | 2/1971 | Cull et al. | 339/198 |
| 3,573,373 | 4/1971 | Mullin et al. | 179/98 |
| 3,611,268 | 10/1971 | Duncan et al. | 339/151 M |
| 3,629,788 | 12/1971 | Hartley | 339/18 B |
| 3,714,618 | 1/1973 | Appleton | 339/198 R |
| 3,729,698 | 4/1973 | Chapman | 339/18 R |
| 3,760,328 | 9/1973 | Georgopulos | 339/18 R |
| 3,784,728 | 1/1974 | De Bortoli et al. | 339/198 R |
| 3,796,848 | 3/1974 | Southworth, Jr. | 200/175 |
| 3,814,990 | 6/1974 | Warman et al. | 317/122 |
| 3,832,498 | 8/1974 | Lawson | 179/98 |
| 3,935,372 | 1/1976 | Triplett et al. | 174/68.5 |
| 3,936,133 | 2/1976 | Splitt et al. | 339/198 R |
| 3,955,868 | 5/1976 | Kindermann et al. | 339/18 B |
| 4,012,096 | 3/1977 | DeLuca et al. | 338/18 R |
| 4,021,096 | 5/1977 | Dragt | 350/6 |
| 4,037,910 | 7/1977 | Paluch | 339/198 R |
| 4,053,719 | 10/1977 | Debortoli et al. | 179/98 |
| 4,087,648 | 5/1978 | Giacoppo | 179/98 |
| 4,089,580 | 5/1978 | Huffnagle et al. | 339/99 R |
| 4,116,525 | 9/1978 | Johnston | 339/132 B |
| 4,131,934 | 12/1978 | Becker et al. | 361/428 |
| 4,160,880 | 7/1979 | Brey | 179/98 |
| 4,176,257 | 11/1979 | DeLuca | 179/98 |
| 4,210,375 | 7/1980 | Saligny | 339/14 L |
| 4,273,966 | 6/1981 | Briggs, Jr. et al. | 179/98 |
| 4,313,039 | 1/1982 | De Luca et al. | 179/98 |
| 4,538,868 | 9/1985 | Cruise et al. | 339/198 R |
| 4,548,366 | 10/1985 | Wirz et al. | 242/18 |

FOREIGN PATENT DOCUMENTS 1206354  8/1959  France ........................ 339/198 GA

OTHER PUBLICATIONS

"2410 Series Line Access Terminal Blocks" ADC Telecommunications.

Primary Examiner—John McQuade
Attorney, Agent, or Firm—Weingarten, Schurgin, Gagnebin & Hayes

[57] ABSTRACT

A frame mounted connectorized terminal block is provided for use in a digital telecommunications facility. The block includes a forward facing front panel containing an array of wire wrap pins and an array of jacks coupled to respective pins and operative for patching of interconnects. Multiple pin connectors are mounted on the rear panel and are internally connected to respective pins on the front panel. The terminal block is extremely compact and is easily attached and removed by a snap action mounting panel.

5 Claims, 2 Drawing Sheets

CONNECTORIZED TERMINAL BLOCK

RELATED APPLICATION

This application is related to copending patent application Ser. No. 760,677, filed July 30, 1985, assigned to the same assignee as this invention.

FIELD OF THE INVENTION

This invention relates to connector blocks for telephone and other telecommunications equipment and more particularly to a connector block used for digital telephone systems.

BACKGROUND OF THE INVENTION

Connector blocks are often used to interconnect the wires from telephones and other telecommunications apparatus to the telecommunication lines. Space is usually a major factor in any telecommunications installation, and it is desirable that the connecting block accommodate the intended number of terminals and connections within the smallest practicable volume. For digital telecommunications facilities, there are electrical as well as mechanical considerations for the efficient design and construction of connector blocks for these purposes. It is desirable that the interconnecting wire lengths be as short as possible to minimize noise reception and to not impair data transmission, especially high speed transmission. It is also desirable that the connector block provide easy access for installation and patching of interconnections.

SUMMARY OF THE INVENTION

Briefly, the present invention provides a connectorized terminal block for use in a digital telecommunications facility and which is adapted to be frame mounted. The block includes a forward facing front panel containing an array of wire wrap interconnection pins and an array of jacks coupled to respective interconnection pins and operative for patching or testing of telecommunications interconnects. Multiple pin connectors are mounted on the rear panel of the block and are internally connected to respective pins on the front panel. The block is extremely compact and is easily attached and removed by a snap action mounting bracket which is preferably secured to a telecommunications equipment frame. The housing is constructed to provide access to the internal wiring, with no impairment to the cross-connecting wiring from the terminal field to the telecommunications wires. The housing also includes fanning strips for routing and retention of the cross-connecting wires in orderly fashion.

DESCRIPTION OF THE DRAWINGS

The invention will be more fully understood from the following detailed description taken in conjunction with the accompanying drawings in which.

DETAILED DESCRIPTION OF THE INVENTION

Figure 1:
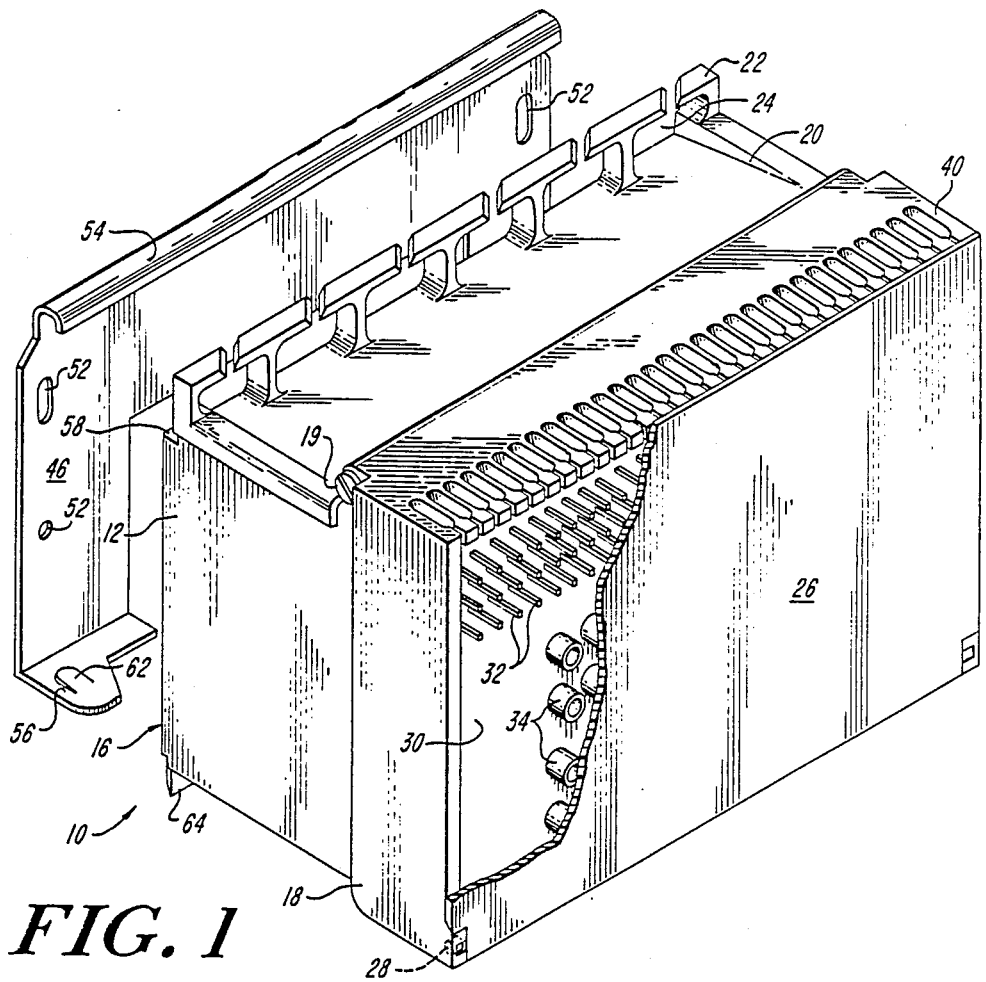
FIG. 1 is a pictorial view, partly cutaway, of a connectorized terminal block in accordance with the invention.
Figure 2:
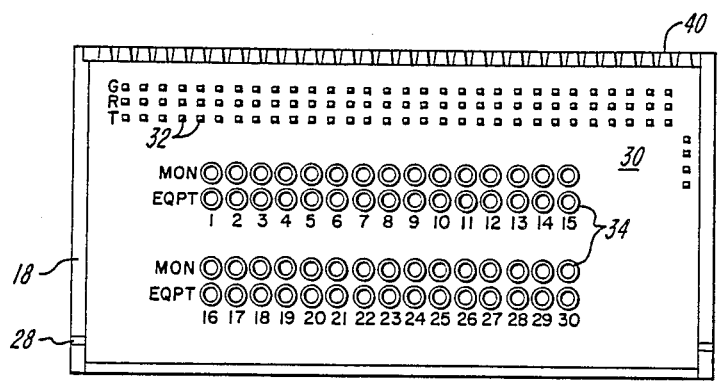
FIG. 2 is a front view of the terminal block with the cover of the second housing section removed.
Figure 3:
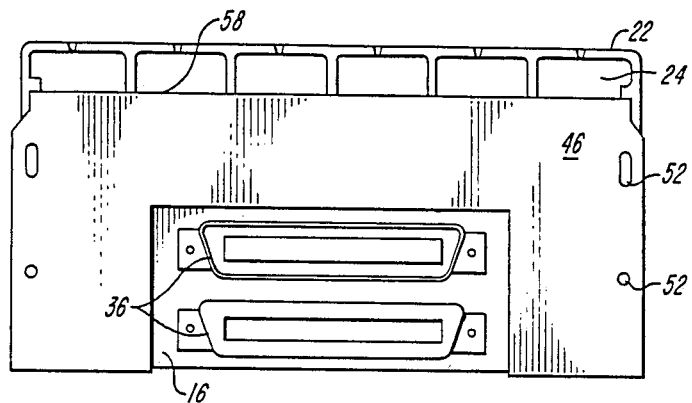
FIG. 3 is a rear view of the terminal block.

Referring to the drawing, FIGS. 1-4, a connectorized terminal block constructed and operative in accordance with the invention is shown, and includes a housing 10 having a first section 12 and a second section 18 pivotally attached to the first section 12 by fasteners 19. The rear wall 16 of section 12 serves as a mounting plate for the block. A cover 20 is provided for the first housing section 12 and includes a rear fanning strip 22 having a plurality of wire channels 24. A cover 26 is provided on the second housing section 18 and is pivotally attached by pins 28 to the front of this section for access to the outer panel 30 and for protection of the wired connections and for label space as required by the user to identify connections.

Terminal pins 32 are disposed in a terminal field defined by insulative panel 30 having openings in which the respective terminals are disposed and secured. As more clearly illustrated in FIG. 4, each terminal pin 32 includes an external forward facing portion 32a and an internal rearward facing portion 32b. The terminals carried by the terminal field are typically single post wire wrapped terminals.

Figure 5:
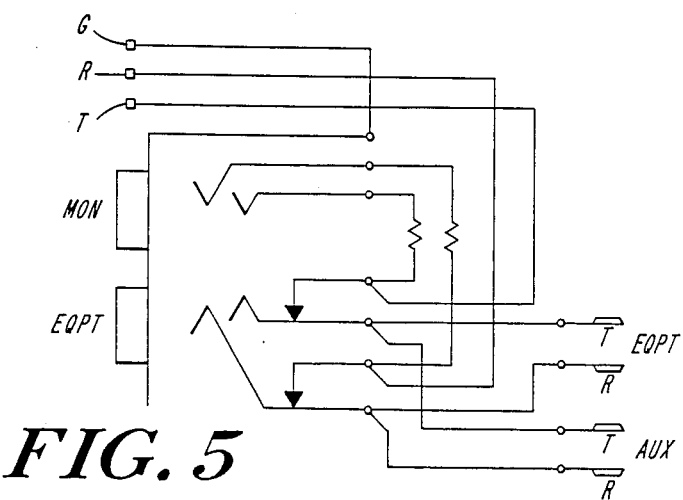
FIG. 5 is a circuit schematic of the internal wiring of the terminal block.

A jack field is also provided on panel 30 composed of two arrays of dual bantam jacks 34. A pair of multi-pin connectors 36 are mounted on the rear wall 16 of housing section 12. The connectors 36, jacks 34 and pins 32 are interconnected within the housing by wires and resistors in accordance with the circuit schematic of FIG. 5.

The second housing section 18 includes a fanning strip 40 for the cross connecting wires, which contains for the illustrated embodiment thirty slots corresponding to the thirty rows of terminal pins 32 of the terminal field. The fanning strip 40 provides positive wire retention, wire strain relief and easy identification of individual circuits. The second housing section 18 can be removed from the first housing section 12 by removing the fasteners 19 to permit easy access to the connectors and terminals for replacement as necessary, or to permit field wiring modification or maintenance. The second housing section 18 is also pivotable with respect to the first housing section 12 about the fasteners 19 from a closed position as shown in FIG. 1 to an open position (not shown) which permits access to the interior of the first housing section 12.

The first housing section 12 is typically stamped and formed from steel, as is the mounting bracket. The second housing section 18 is of molded high quality thermoplastic, as is the top cover 20 of the first housing section, and the front cover 26 of the second housing section.

A mounting bracket 46 has circular and elongated openings 52 therethrough to provide a universal mounting configuration for use on standard telephone industry distributing frames. The bracket includes a rolled lip 54 along one edge and latch tabs 56 on the opposite bottom edges to permit the housing 10 to be snapped onto and retained by the mounting bracket. The mounting bracket is installed on the distributing frame by threaded fasteners or other convenient fastening elements. The terminal block is mounted by inserting an upper edge 58 of the rear wall 16 at the rear of the first housing section 12 under the rolled lip 54 of the mounting bracket, and snapping the lower rear corner sections 64 of the rear wall 16 over detents 62 of the mounting bracket tabs 56. No auxiliary hardware is needed to attach the terminal block to the mounting bracket 46. The terminal block can be easily removed from the mounting bracket by using a screw driver or other tool between the tabs 56 and the terminal block housing 10 and employing a prying force to urge the housing out of the mounting tabs.

The connectors 36 are telephone industry standard male and female ribbon connectors which are adapted to mate with cooperative connectors of interconnecting cables. The terminal block is typically mounted horizontally as illustrated in FIG. 1 with the fanning strips 22 at the top rear edge.

Figure 4:
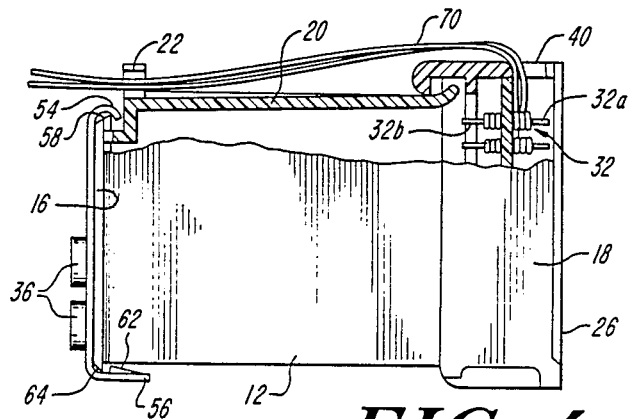
FIG. 4 is a partly cutaway side view of the terminal block.

The manner of cross connecting wires to the terminal block is as illustrated in FIG. 4. The wires 70 are routed through the front and rear fanning strips 22 and 40 and are connected to respective terminals 32. The wires are maintained in orderly disposition by the slots of the fanning strips for ease of identification and replacement if necessary. After all cross connectors are made to the terminal field, the front cover 26 is closed over the terminal and jack field to enclose the users wired terminations.

In the illustrated embodiment the housing is about 4 inches high by 8 inches wide, with a depth of about 6 inches. The terminal blocks can be end-to-end mounted for size efficient installations.

The invention is not to be limited by what has been shown and described except as intended in the appended claims.

What is claimed is:

1. A connectorized terminal block comprising:
   a first housing section having a rear wall having a plurality of electrical multi-pin connectors mounted thereon for connectorized mating with cooperative connectors of external interconnecting cables, said rear wall serving as a mounting plate for said connectorized terminal block, an open front, and a top cover, said top cover including a rear fanning strip having a plurality of wire channels;
   a second housing section pivotally attached to said first housing section at said open front of said first housing section and wherein said second housing section is pivotable to open and closed positions, respectively, in relation to said first housing section, and further wherein said second housing section is operative in the closed position to cover said open front and operative in the open position to expose said open front for access to an interior of said first housing section;
   pivot means for pivotally attaching said second housing section to said first housing section for pivotal movement of said second housing section to open and closed positions, respectively, with respect to said first housing section;
   an insulative panel disposed within said second housing section;
   a terminal field disposed in said insulative panel disposed within said second housing section, said terminal field containing an array of electrical terminal pins having external forward facing portions and internal rearward facing portions, said internal rearward facing portions of said electrical terminal pins directed towards said rear wall of said first housing section with said second housing section in the closed position and said external forward facing portions directed opposite to said internal rearward facing portions;
   a jack field disposed in said insulative panel disposed within said second housing section, said jack field containing an array of forward facing jacks and wherein said forward facing jacks are internally wired within said connectorized terminal block to respective ones of said internal rearward facing portions of said electrical terminal pins of said terminal field and said plurality of electrical multi-pin connectors mounted on said rear wall of said first housing section;
   said second housing section including a fanning strip adjacent said pivot means, said fanning strip having having a plurality of wire channels; and
   a front cover pivotally attached to said second housing section operative to enclose said insulative panel having disposed therein said terminal field and said jack field within said second housing section;
   said external forward facing portions of said electrical terminal pins adapted for electrical connection to cross connecting wires routed thereto via said plurality of wire channels of said rear fanning strip of said top cover and said plurality of wire channels of said fanning strip of said second housing section;
   and wherein said forward facing jacks of said jack field are adapted for plug connection to patch circuits.

2. The connectorized terminal block of claim 1 wherein said rear wall includes a first edge portion and rear corner sections, said rear corner sections oppositely extending from said rear wall in relation to said first edge portion, and wherein said connectorized terminal block coacts with
   a mounting bracket adapted for attachment to said rear wall, the mounting bracket having a lip portion cooperative with said first edge portion and tabs coacting with respective ones of said rear corner sections for snap action retention of said connectorized terminal block to the mounting bracket.

3. The connectorized terminal block of claim 1 including a mounting bracket adapted for attachment to a mounting surface and
   wherein the mounting bracket coacts with said rear wall of said first housing section and further wherein said rear wall includes means cooperative with the mounting bracket for snap action retention of said connectorized terminal block to the mounting bracket.

4. The connectorized terminal block of claim 1 wherein said panel of insulative material disposed in said second housing section is spaced inwardly from said front cover of said second housing section, said insulative panel containing said array of electrical terminal pins constituting said terminal field and said array of forward facing jacks constituting said jack field.

5. The connectorized terminal block of claim 4 wherein said array of electrical terminal pins are wire-wrap terminals.

* * * * *